Oct. 22, 1957 — B. ROZETT — 2,810,588
RETRACTABLE CASTER WHEEL FOR TRAILER TONGUE
Filed Aug. 30, 1954 — 4 Sheets-Sheet 3
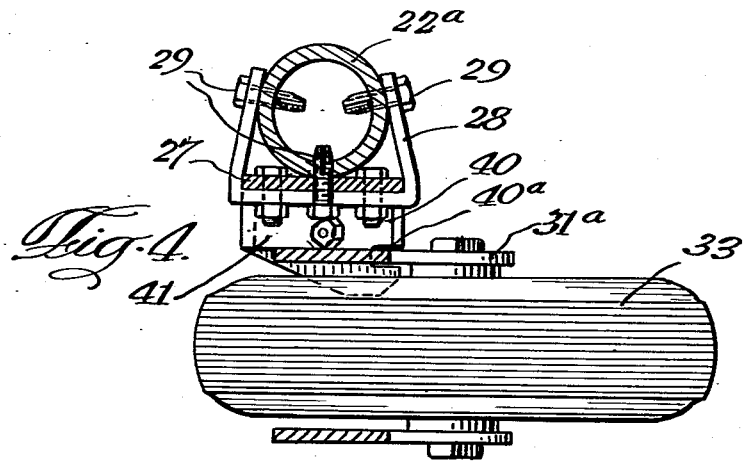
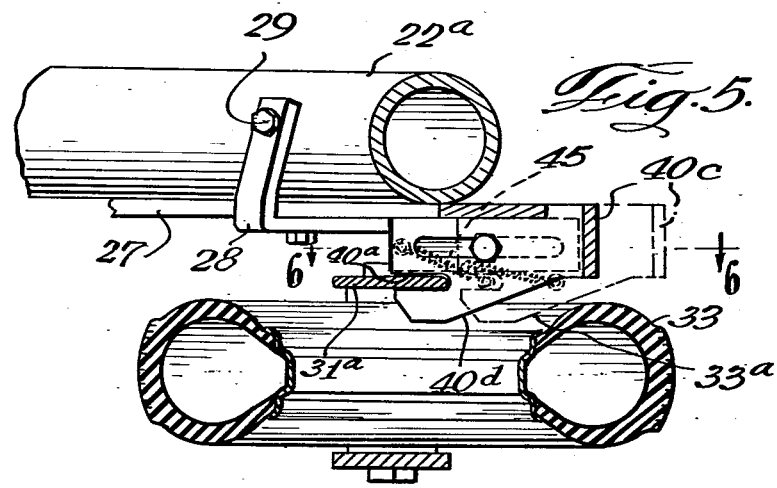
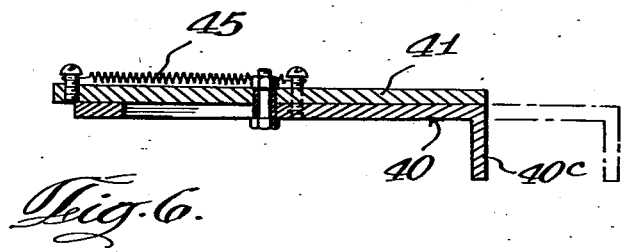

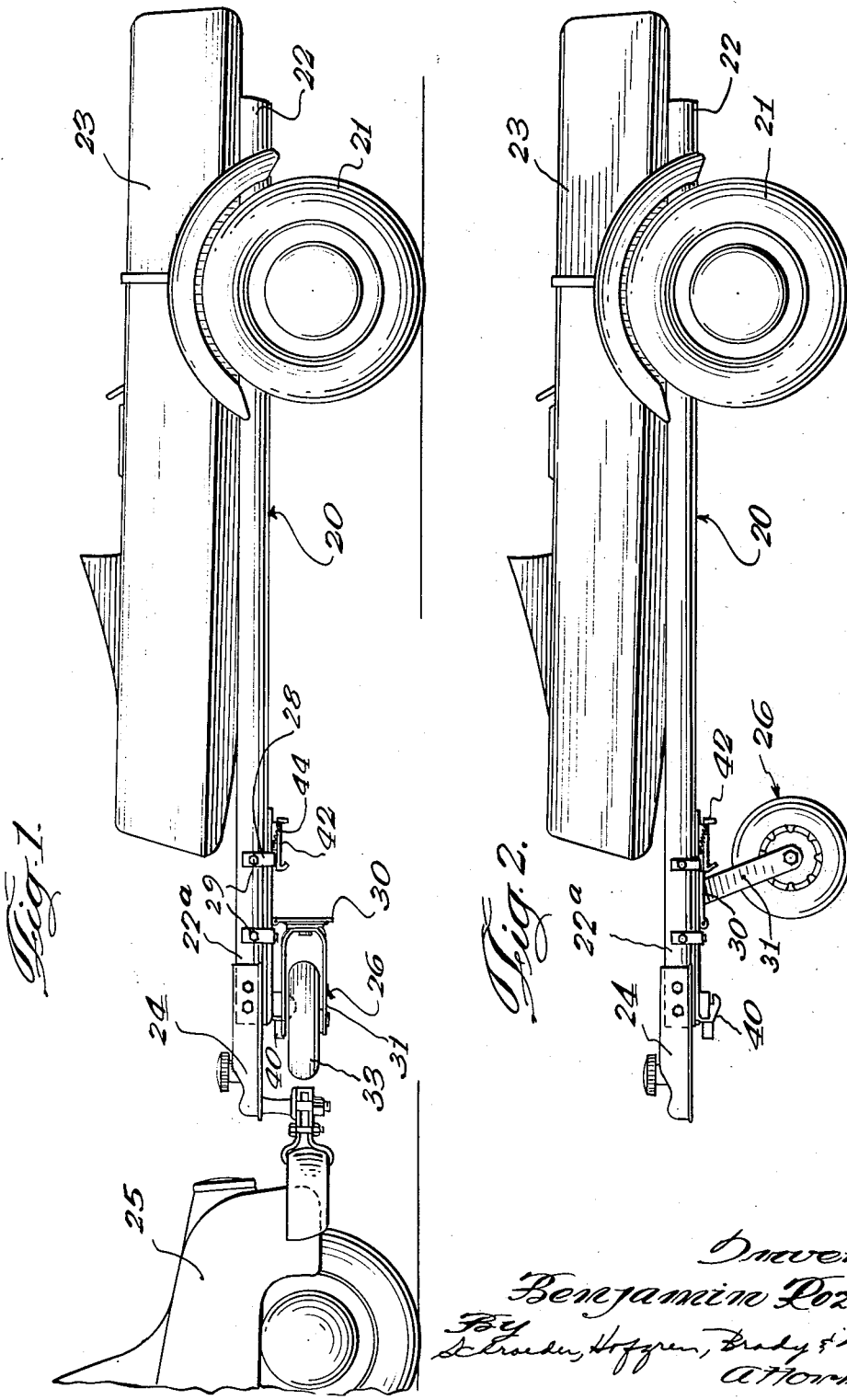

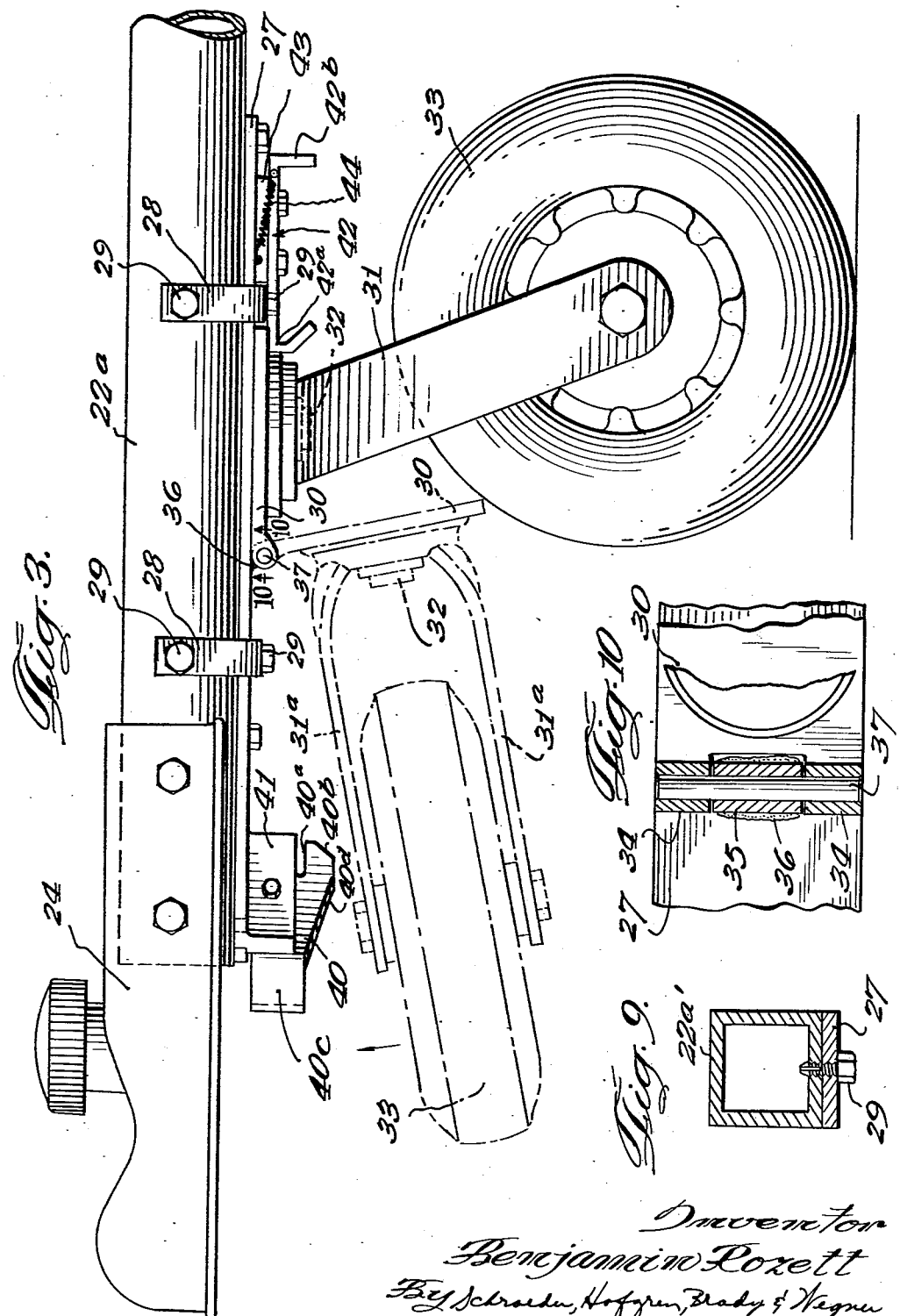

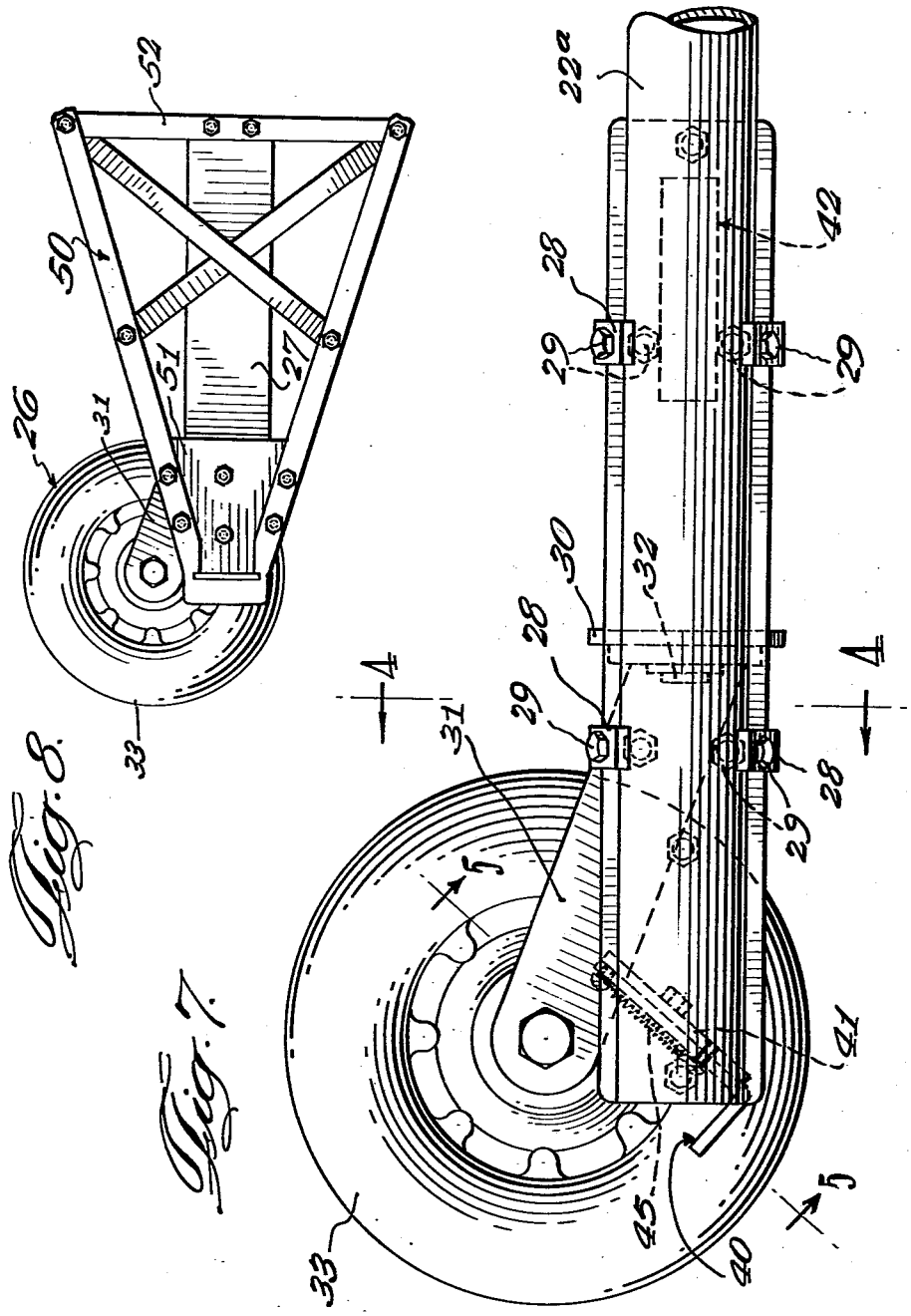

United States Patent Office 2,810,588
Patented Oct. 22, 1957

2,810,588

RETRACTABLE CASTER WHEEL FOR TRAILER TONGUE

Benjamin Rozett, Chicago, Ill.

Application August 30, 1954, Serial No. 453,023

8 Claims. (Cl. 280—150.5)

This invention is concerned with a caster wheel and more particularly with a retractable caster wheel for use with a wheeled vehicle having a tongue.

Many types of trailers are well known and they have many varied uses. One of the most common forms of trailer has two wheels and is provided with a tongue which may be secured to a draft vehicle such as an automobile. Trailers of this type have countless uses. It often happens that one arrives at a destination with a loaded trailer and desires to maneuver it into a relatively confined area. This is generally a difficult procedure as it requires quite a bit of skill to back an automobile with a trailer attached thereto. As a result, the trailer is sometimes unhitched from the automobile at the destination and maneuvered into the desired position by hand. This generally involves a large amount of physical labor, particularly if the trailer is heavily loaded.

It is known to provide the tongue of such trailers with a small dolly wheel to facilitate the handling of the trailer when it is unhitched from the automobile. I have devised and disclose and claim herein a novel and improved retractable caster wheel assembly for use with a trailer and which may readily be moved between retracted and extended positions and which may be readily attached to the tongue of the trailer.

A feature of the invention is the provision of a tongue support comprising a caster wheel, hinge means for mounting the caster wheel on the tongue, the wheel being pivotally movable between retracted and extended positions, first latch means for securing the wheel in retracted position and second latch means for securing the wheel in extended position. Another feature is that the hinge means comprise a first hinge member secured directly to the tongue, a second hinge member secured directly to the caster wheel and a pintle inserted through the hinge members.

A further feature is the provision, in a wheeled vehicle having a tongue, of a retractable support of the character described comprising a swivel caster wheel assembly including a top plate, a fork swivelly mounted thereon and a wheel carried by the fork, hinge means for mounting the caster wheel assembly on the tongue, the wheel assembly being pivotally movable between retracted and extended positions, first spring latch means carried by the tongue and engageable with the fork for securing the wheel in retracted position, and second spring latch means carried by the tongue and engageable with the top plate for securing the wheel assembly in extended position.

Still another feature is that movement of the first latch means to release the wheel assembly causes a portion of the latch to strike the wheel assembly positively disengaging the fork from the latch.

Further features and advantages will readily be apparent from the following specification and from the drawings, in which:

Figure 1 is a side elevation view of a trailer attached to an automobile, with the wheel assembly of the present invention shown in retracted position;

Figure 2 is a view similar to Figure 1 with the trailer unhitched from the automobile and with the support wheel in extended position;

Figure 3 is a side elevation view of a portion of the tongue of a trailer showing the support wheel in extended position;

Figure 4 is a view taken along line 4—4 of Figure 7;

Figure 5 is a sectional view taken along line 5—5 of Figure 7;

Figure 6 is a fragmentary sectional view taken along line 6—6 of Figure 5;

Figure 7 is a plan view of the wheel assembly in retracted position;

Figure 8 is a plan view of the wheel assembly mounted on an "A frame" trailer;

Figure 9 is a sectional view of the mounting arrangement employed with a square tongue trailer; and Figure 10 is a fragmentary sectional view taken along line 10—10 of Figure 3.

While the invention will be described herein as applied to a two-wheel boat trailer, it is to be understood that it may be usefully employed with many other types of trailers. The problems solved by this invention are however particularly apparent when a boat trailer is considered.

Referring to Figure 1 of the drawings, reference numeral 20 indicates generally a common type of boat trailer having a pair of wheels 21 joined by an axle (not shown) on which a longitudinal frame member 22 is mounted. A suitable cradle (not shown) is provided to support boat 23 on the trailer. The forward or tongue portion 22a of frame member 22 is provided with a coupling arrangement 24 by means of which the trailer may be hitched to the rear bumper of an automobile 25. When the trailer is hitched to the automobile as in Figure 1, the support wheel assembly indicated generally as 26, and which is attached to the underside of the tongue 22a at the forward end thereof, is preferably maintained in retracted position as shown in Figure 1.

Referring now to Figure 2, the trailer 20 is unhitched from the automobile and the caster wheel assembly 26 is shown in extended position. This provides the boat trailer with three-point support and permits the trailer to be readily moved about, for example, to a storage place in the yard where it would be difficult to maneuver the trailer with an automobile. All of the weight of the boat and trailer is supported by the three wheels during this operation and the entire unit may be readily moved about by one person without the need for lifting the tongue of the trailer and supporting the weight of the boat.

Referring now to Figure 3, the caster wheel assembly 26 includes a base plate 27 which is shown secured to the underside of a round trailer tongue 22a by brackets 28 and self-tapping metal screws 29. The caster wheel comprises a top plate 30 which has a fork 31 swivelly mounted thereon by means of a bearing 32. Wheel 33 is rotatably carried at the lower ends of the legs 31a of the fork.

The top plate 30 has one end thereof formed into integral looped hinge member 34. A cooperating hinge member 35 is welded directly to base plate 27 as shown at 36, Figure 10. A pintle 37 is inserted through the looped hinge portions 34 and 35 securing the fork and wheel to the base plate.

A first manually operated spring latch 40 is slideably mounted on a depending plate 41 at one end of base plate 27 and is provided with a slot 40a adapted for engagement with one of the legs 31a of the fork to retain the caster wheel in retracted position.

A second spring latch 42 is mounted on the underside of base plate 27 on the side of the hitch arrangement opposite the first latch 40. Latch 42 is spaced from base plate 27 by an intermediate plate 43 and has an end portion 42a which is adapted for engagement with top plate 30 to maintain the caster wheel in extended position.

As shown in Figure 3, spring 44 biases the latch 42 toward the hinge to keep it in engagement with top plate 30. The downwardly extending end portion 42b of the latch 42 may be grasped to draw the latch to the right disengaging the top plate and permitting the wheel assembly to be retracted.

The caster wheel assembly is provided with an appreciable amount of lead (the horizontal distance between the center of rotation of the fork 31 on the top plate 30 and the center of wheel 33) to permit the caster wheel to trail properly when the trailer is being moved. As a result when the wheel assembly is retracted, the wheel and fork being rotated about swivel bearing 32 to a horizontal position, the fork extends outwardly from the trailer tongue 22a (Figure 7) and the wheel 33 is offset therefrom.

The arrangement of the first spring latch 40 is best shown in Figures 4–7. Latch 40 is mounted at an angle on the underside of base plate 27 so that the slot 40a therein engages fork leg 31a in a direction substantially normal to the edge thereof. The edge 40b of latch 40 adjacent slot 40a is cut at an angle as shown to facilitate latching of the wheel assembly into retracted position. Movement of latch 40 against the force of bias spring 45 may be effected by grasping portion 40c thereof. Such movement causes the bottom edge 40d of the latch to strike the inner edge 33a of wheel 33 forcing it downwardly (pivoting the fork 31 about the swivel 32) positively disengaging the fork from the latch (Figure 5).

The ease of operation of the retractable wheel is readily apparent. Normally when the trailer is being towed behind the automobile the wheel assembly will be kept in retracted position and as it is turned to a horizontal position, it is kept up out of the way. When it is desired to unhitch the trailer from the automobile and move it about by hand, the wheel may be lowered by pulling outwardly on the portion 40c of latch 40 positively effecting release of the wheel assembly as previously described. The wheel assembly will normally swing far enough under its own momentum to strike and be engaged by latch 42 which secures it in extended position. If this does not occur it is a simple matter to move the assembly by hand into engagement with latch 42. The trailer may then be unhitched from the automobile and easily moved about as desired.

Figure 9 shows base plate 27 attached directly to a square trailer tongue 22a' by means of self-tapping metal screws 29, the brackets used with the round boom being dispensed with. If desired, of course, brackets may be used to provide additional strength.

Figure 8 shows an arrangement for mounting the retractable wheel assembly 26 on an "A frame" trailer 50. Here, one end of the base plate 27 may be secured to the gusset 51 while the other end is secured to a cross brace 52. Many other arrangements will of course be obvious to those skilled in the art. The portion of the "A frame" 50 shown in Figure 8 is to be understood to be the full equivalent of the trailer tongues 22a and 22a' shown and described previously.

It is considered obvious that the base plate 27 may be dispensed with and the latches 40 and 42 and caster wheel top plate 30 attached directly to the underside of the trailer tongue. Where the term "base plate" is used in the claims it is to be understood to mean either the trailer tongue itself or a separate plate.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a wheeled vehicle having a tongue, retractable support means of the character described, comprising: a swivel caster wheel assembly including a top plate and a fork carrying wheel; hinge means for mounting said caster wheel assembly on said tongue, said wheel assembly being pivotally movable between retracted and extended positions; first spring latch means on said tongue and engageable with said fork for securing said wheel in retracted position, said latch means having a surface adjacent said wheel, operation of said latch to release said wheel assembly causing said surface of the latch to strike said wheel assembly, positively disengaging said fork from said latch; and second latch means on said tongue and engageable with said top plate for securing said wheel in extended position.

2. In a two-wheeled trailer for use with an automobile and having a tongue adapted for connection with the automobile, an auxiliary support of the character described, comprising: a base plate; a caster wheel assembly having a fork supporting a wheel; a hinge pivotally mounting the caster wheel assembly on the base plate for movement between retracted and extended positions; a first spring latch on said base plate for engagement with said fork to retain the caster wheel assembly in retracted position, the engaging surfaces of the fork and first latch being so arranged that the wheel is locked in a generally horizontal plane under the base plate while retracted; and a second spring latch on said base plate for engagement with said caster wheel assembly to retain it in extended position.

3. Means of the character described in claim 2, wherein said first latch means engages the fork of said wheel assembly, said latch means being movable in a direction generally normal to the edge of said fork.

4. In a two-wheeled trailer for use with an automobile and having a tongue adapted for connection with the automobile, an auxiliary support of the character described, comprising: a base plate; a caster wheel assembly having a fork supporting a wheel, said fork having a surface extending generally parallel to the plane of the caster wheel assembly; a hinge pivotally mounting the caster wheel assembly on the base plate for movement between retracted and extended positions; a first spring latch slidably mounted on the underside of said base plate and having a generally horizontal surface for engagement with said fork to retain the caster wheel assembly in retracted position, said generally horizontal latch surface engaging the surface of said fork to carry the caster wheel in a generally horizontal plane under the base plate while retracted; and a second spring latch slidably mounted on said base plate, on the opposite side of said hinge from the first spring latch, for engagement with said caster wheel assembly to retain it in extended position.

5. The support of claim 4 wherein said fork includes a flat leg member extending generally parallel to the plane of the caster wheel assembly and said first spring latch is provided with a generally horizontally extending slot having its lower boundary defined by said horizontal surface.

6. In a two-wheeled trailer for use with an automobile and having a tongue adapted for connection with the automobile, an auxiliary support of the character described, comprising: a base plate; a caster wheel assembly including a top plate, a fork swivelly mounted thereon and extended therefrom at an acute angle and a wheel rotatably carried by the fork; a hinge pivotally mounting the top plate of the caster wheel assembly on said base plate for movement between a retracted position in which the top plate is generally perpendicular and an extended position in which the top plate is generally horizontal; a first spring latch slidably mounted on said base plate adjacent said hinge, said first latch having a cam surface engaged by said fork on retraction of the caster wheel assembly to effect engagement of the fork by a generally horizontal surface of the latch, retaining the wheel in a generally horizontal position under said base plate; and a second spring latch on the opposite side of said caster wheel assembly from said hinge and having a cam surface engaged by said top plate on extension of the assembly to effect operation of the second latch to engage the top plate retaining the caster wheel assembly in extended position.

7. An auxiliary support of the character described in claim 6, wherein said first latch has a bottom surface which engages a surface of the wheel on manual movement of the latch, positively disengaging the fork from the latch.

8. In a retractable wheel assembly having a yoke for carrying a wheel swingably mounted to move between a vertical, extended position and a horizontal, retracted position, means for retaining releasably said yoke in a retracted position comprising a latch spring-urged to a latching position, with a cam means on said latch for operative association with the wheel and yoke, the movement of said wheel toward the retracted position effecting engagement between the yoke and said cam means to move the latch momentarily from the latching position and allow the wheel to move into the retracted position whereupon said cam means permits the latch to return automatically to the latching position and retain the wheel in the retracted position, said cam means being further arranged to permit movement of said latch from the latching position to effect engagement of the cam means with the wheel and urge the wheel away from the retracted position.

References Cited in the file of this patent

UNITED STATES PATENTS

| | | |
|---|---|---|
| 1,524,083 | Clement | Jan. 27, 1925 |
| 2,162,181 | Skinner | June 13, 1939 |
| 2,296,789 | Johnson | Sept. 22, 1942 |
| 2,519,364 | Fredholm | Aug. 22, 1950 |
| 2,525,506 | Wiedman | Oct. 10, 1950 |
| 2,595,453 | Gilmore | May 6, 1952 |
| 2,627,424 | Chapin | Feb. 13, 1953 |
| 2,680,028 | Cook | June 1, 1954 |

FOREIGN PATENTS

| | | |
|---|---|---|
| 784,878 | France | May 6, 1935 |
| 690,707 | Great Britain | Apr. 29, 1953 |
| 193,812 | Switzerland | Feb. 1, 1938 |